US012812006B2

(12) United States Patent
Byrd et al.

(10) Patent No.: US 12,812,006 B2
(45) Date of Patent: Nov. 24, 2026

(54) METHOD AND SYSTEM TO IMPLEMENT ACCESS TO A CLOUD UPLOAD BEFORE ENTIRETY OF CONTENT HAS BEEN UPLOADED

(71) Applicant: Backblaze, Inc., San Mateo, CA (US)

(72) Inventors: Stephen Byrd, Campbell, CA (US); Brian Beach, Bloomington, IN (US); Fabian Morgan, San Mateo, CA (US); Bala Krishna Gangisetty, Milpitas, CA (US); Elton Joseph Carneiro, Ottawa (CA)

(73) Assignee: Backblaze, Inc., San Mateo, CA (US)

( * ) Notice: Subject to any disclaimer, the term of this patent is extended or adjusted under 35 U.S.C. 154(b) by 0 days.

(21) Appl. No.: 18/655,165

(22) Filed: May 3, 2024

(65) Prior Publication Data

US 2025/0343837 A1 Nov. 6, 2025

(51) Int. Cl.
*H04L 67/1097* (2022.01)
*G06F 16/13* (2019.01)

(52) U.S. Cl.
CPC ................................ *H04L 67/1097* (2013.01)

(58) Field of Classification Search
CPC .. G06F 16/182; G06F 16/183; G06F 16/1752; G06F 3/067; G06F 11/2094; G06F 16/13; H04L 67/1097; H04L 67/06; H04L 65/4025
See application file for complete search history.

(56) References Cited

U.S. PATENT DOCUMENTS

2013/0091188 A1* 4/2013 Du ...................... H04L 67/1097 707/827
2018/0034892 A1* 2/2018 Olsen ...................... G06F 16/17
2020/0404361 A1* 12/2020 Lohmar ............. H04N 21/2343
2023/0011518 A1* 1/2023 Chadwick .............. H04L 65/80

OTHER PUBLICATIONS

Gale, N. "Cloud Storage Vs. Backup: B2, Backup, or Both?," Backblaze, URL: https://www.backblaze.com/blog/cloud-storage-vs-backup-to-b1-b2-or-both/, dated Sep. 1, 2020.
Cohen, P., "The Cloud's Software: A Look Inside Backblaze," Backblaze, URL: https://www.backblaze.com/blog/the-clouds-software-a-look-inside-backblaze/, dated Mar. 10, 2017.
Klein, A., "How Backblaze Scales Our Storage Cloud," Backblaze, URL: https://www.backblaze.com/blog/how-backblaze-scales-our-storage-cloud/, dated May 21, 2024.
(Continued)

*Primary Examiner* — Nicholas R Taylor
*Assistant Examiner* — Ho T Shiu
(74) *Attorney, Agent, or Firm* — Vista IP Law Group, LLP

(57) ABSTRACT

Disclosed is an improved approach to provide access to uploaded content even before the entirety of the content has been uploaded to cloud-based storage. This permits the user and/or the user's authorized services or data consumers to read partial data while multi-part upload[s] are still in progress.

18 Claims, 18 Drawing Sheets

(56) References Cited

OTHER PUBLICATIONS

Beach, B., "Backblaze Vaults: Zettabyte-Scale Cloud Storage Architecture," Backblaze, URL: https://www.backblaze.com/blog/vault-cloud-storage-architecture/, dated Jun. 18, 2019.
Wilson, B., "Backblaze Durability Calculates at 99.999999999%—And Why It Doesn't Matter," Backblaze, URL: https://www.backblaze.com/blog/cloud-storage-durability/, dated Jul. 17, 2018.
Klein, A., "The Drive Stats of Backblaze Storage Pods," Backblaze, URL: https://www.backblaze.com/blog/the-drive-stats-of-backblaze-storage-pods/, dated Jan. 3, 2024.
Nufire, T., "The Hardware Inside Backblaze B2 Cloud Storage: Storage Pod 5.0," Backblaze, URL: https://www.backblaze.com/blog/cloud-storage-hardware/, dated Nov. 10, 2015.
Patterson, P., "How We Achieved Upload Speeds Faster Than AWS S3," Backblaze, URL: https://www.backblaze.com/blog/2023-performance-improvements/, dated Nov. 2, 2023.
Gale, N., "What Is an API?," Backblaze, URL: https://www.backblaze.com/blog/what-is-an-api/, dated Aug. 13, 2020.
Rivas, K., "Cloud Storage Performance: The Metrics That Matter," Backblaze, URL: https://www.backblaze.com/blog/cloud-storage-performance-the-metrics-that-matter/, dated Oct. 24, 2023.
Klein, A., "Yes, Backblaze Just Ordered 100 Petabytes of Hard Drives," Backblaze, URL: https://www.backblaze.com/blog/400-petabytes-cloud-storage/, dated Oct. 5, 2017.
Nowak, B., "Backblaze Network Stats," Backblaze, URL: https://www.backblaze.com/blog/backblaze-network-stats/, dated Dec. 14, 2023.
Klein, A., "Storage Pod 4.0: Direct Wire Drives," Backblaze, URL: https://www.backblaze.com/blog/backblaze-storage-pod-4/, dated Mar. 19, 2014.
Klein, A., "A Behind the Scenes Look at Designing the Next Storage Pod," Backblaze, URL: https://www.backblaze.com/blog/designing-the-next-storage-pod/, dated Sep. 1, 2015.

* cited by examiner

METHOD AND SYSTEM TO IMPLEMENT ACCESS TO A CLOUD UPLOAD BEFORE ENTIRETY OF CONTENT HAS BEEN UPLOADED

BACKGROUND

In a cloud computing environment, computing systems and services may be provided as a service to user. For example, a common use of the cloud computing model is to provide cloud-based storage to users of the service. With this approach, the user's data may employ the cloud service to store some or all of the user's data to the cloud. The content that is uploaded to the cloud may then be accessed by the users for download at any time.

One common use scenario for cloud-based storage is to provide a backup solution for users. For a given personal computer (PC) or server managed by a user, the contents of that PC or server may be uploaded to the cloud-based storage to back up all or selected portions of the data on the PC or server. This provides a secure and cost-effective backup solution for many users that cannot otherwise efficiently develop or maintain their own on-premises backup system due to cost or technical expertise reasons.

Another common use scenario is to place uploaded content into a cloud-based location such that multiple downstream consumers of the uploaded content can now more easily access that content. By way of a simple illustrative example, consider an end user that has recorded a very large video file. That end user may be desirous of having that video file be operated upon by multiple downstream video processing services. For example, the user may seek to have closed captioning applied by a first downstream service, video format conversion applied by a second downstream service, and cleanup/editing/artifact removal applied by a third downstream service. With this approach, the user can upload the video file to the cloud-based storage system, and then provide an access link to any number of downstream services to access that content through the cloud. In this way, the cloud-based storage system provides a very efficient approach to distribute the uploaded content to multiple downstream downloaders/consumers of that content.

The issue addressed by this document is that depending upon the size and composition of the content to be uploaded, it is possible that a significant amount of time is needed to upload the entirety of the content. With conventional systems, what this means is that during the interval of time needed to upload the entirety of the content, the downstream consumers will be unable to download that content. This causes delays in the processing of that content by the desired consumers of the content. In addition, this delay effectively creates a bottleneck to any processing workloads that are dependent upon getting access to that content.

Therefore, there is a need for an improved approach to implement access to content that is uploaded to a cloud storage environment that addresses the issues identified above.

SUMMARY

Some embodiments are directed to an approach for implementing a mechanism to provide access to uploaded content even before the entirety of the content has been uploaded to cloud-based storage. This permits the user and/or the user's authorized services or data consumers to read partial data while multi-part upload[s] are still in progress. This approach therefore helps to optimize any downstream workflow that relies upon the content for efficiency, which mitigates any delays caused by the time-consuming nature of large file uploads.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments are directed to an approach to provide access to uploaded content even before the entirety of the content has been uploaded to cloud-based storage. This permits the user and/or the user's authorized services or data consumers to read partial data while multi-part uploads are still in progress. This approach therefore helps to optimize any downstream workflow that relies upon the content for efficiency, which mitigates any delays caused by the time-consuming nature of large file uploads.

Figure 1:
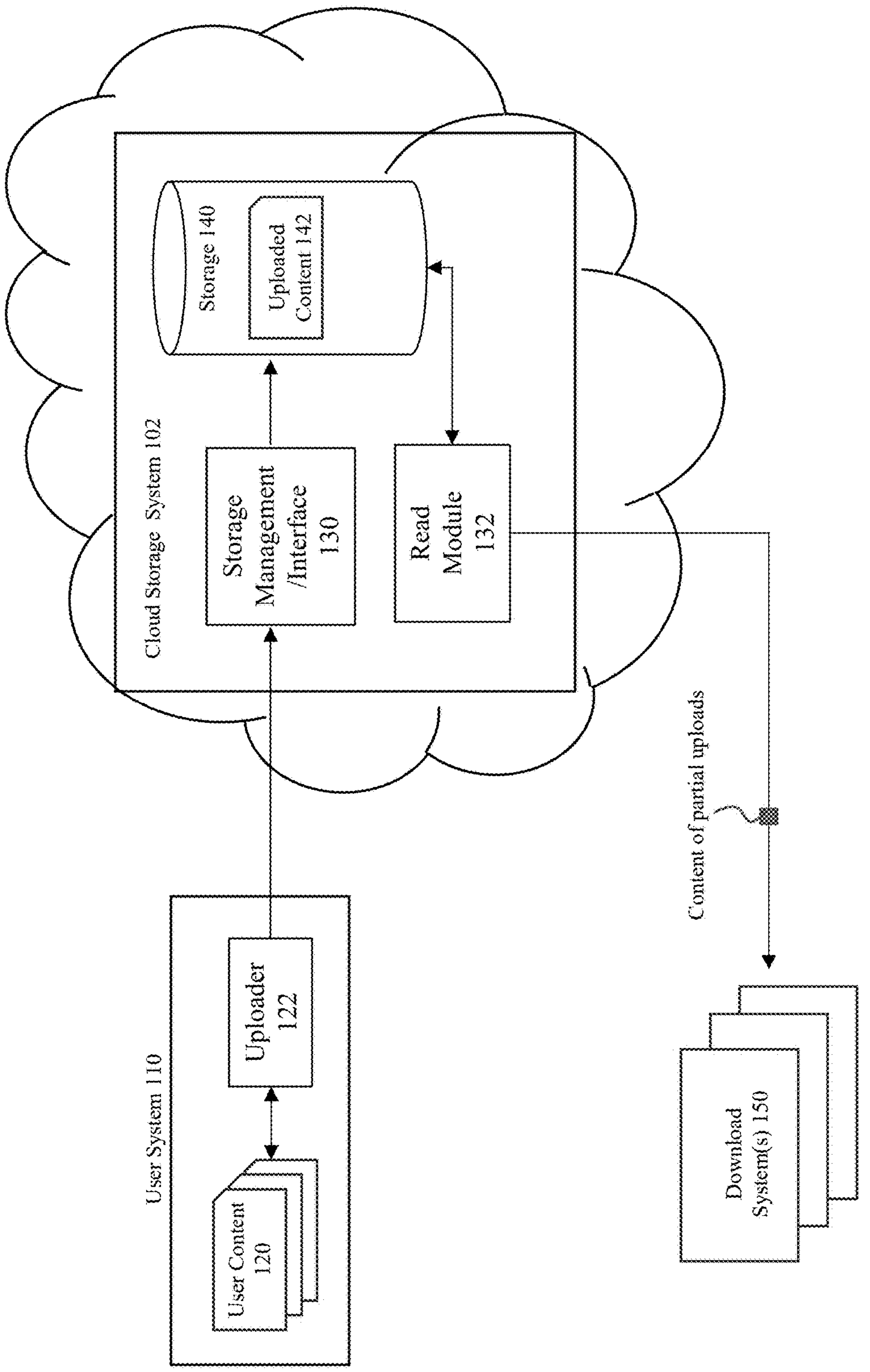
FIG. 1 provides a high-level illustration of an architecture to implement intermediate reads for cloud uploads according to some embodiments of the invention.

FIG. 1 provides a high-level illustration of this mechanism according to some embodiments of the invention. This figure shows a cloud storage system 102 that includes one or more cloud storage resources 140 that are used by one or more cloud users 110 for storage of uploaded content. The cloud storage system 102 may be embodied as any system that provides storage resources in the cloud. Examples of such cloud storage systems include for instance Amazon's S3 storage service and cloud storage provided by Backblaze, Inc. The cloud storage resources 140 correspond to any type of resource that may be allocated and used within a cloud storage environment. The cloud storage resources 140 comprise any combination of hardware and software that allows for ready access to the data that is located at a computer readable storage device. For example, the cloud storage resources 140 could be implemented as computer memory operatively managed by an operating system or in more persistent storage such as hard disks (HDDs), solid-state storage devices (SSDs), or network-based storage devices. The data in the cloud storage resources 140 could also be implemented as database objects and/or files in a file system.

One or more users or applications use a user station 110 to interact with the cloud storage system 102. The user station 110 comprises any type of computing station that may be used to operate or interface with the cloud storage system 102. Examples of such access or user system include, for example, workstations, personal computers, mobile devices, remote computing terminals, servers, cloud-based services, or applications. The access/user system may comprise a display device, such as a display monitor, for displaying a user interface to users at the station. The access/user system may also comprise one or more input devices for the user to provide operational control over the activities of the architecture, such as a mouse or keyboard to manipulate a pointing object in a graphical user interface to generate user inputs.

The user may generate user content 120 that is currently stored locally at the user station 110. However, the user may choose to upload the content 120 from the user station 110 to be stored into the cloud at the cloud storage system 102. The upload process may cause the user content 120 to be stored as uploaded content 142 within the cloud storage resources 140 at the cloud storage system 102.

The user may employ an uploader 122 to perform the process of uploading the content 120 to be stored into the cloud within the cloud storage system 102. Any suitable type of uploader may be employed to implement the upload processing. For example, a standalone uploader application may be employed to upload the content to the cloud. In addition, a command line interface (CLI) approach may be employed to implement the uploader, e.g., where a CLI such as Boto3 may be used to upload content into AWS S3 cloud storage. One or more system/software developers kits (SDKs) may also be used to interface with specific cloud storage vendors to implement an uploader. These SDKs may correspond to any suitable programming language or system, e.g., using Python or Java. The uploader may also be implemented using application programming interfaces (APIs) provided by the cloud storage vendor to interface with the functionality of their respective cloud storage systems.

The uploader 122 will interact with a storage management/interface 130 at the cloud storage system 102 to perform the upload process. The CLI commands and/or API calls made by the uploader will be received at the storage management/interface 130 to upload the content 120, and to make sure the desired storage functionality and parameters are identified as part of the CLI/API instructions. The cloud storage system will then perform internal operations within the system to store the uploaded content 142 within the cloud storage resources 140 at the cloud storage system 102.

The upload process may employ a multipart upload to upload a single content object as a set of parts, where each part is a contiguous portion of the content object's data. The uploader may choose to upload these parts independently of each other, and can upload these parts in any order. This is helpful to computational cost and efficiency, for instance, where the uploader uses a multi-threaded approach to upload multiple parts at the same time in parallel in order to reduce the latency of the upload process. For larger objects that are uploaded over a stable high-bandwidth network, the multipart upload can serve to maximize the use of available bandwidth by uploading object parts in parallel for multi-threaded performance. When uploading over a less-reliable network connection, the multipart upload can increase resiliency to network errors by avoiding upload restarts, since when using multipart upload, the system only needs to retry uploading just the parts that were previously interrupted during the upload, rather than requiring a restart of the entire upload from the beginning for the entire content object.

If transmission of any part fails, the uploader can choose to retransmit that part without affecting other parts. After all parts of the content object have been uploaded, the cloud storage system will assemble the different parts together to recreate the content object. In general, when an object size is large enough (e.g., over 100 MB), the user is likely to use multipart uploads instead of uploading the object in a single operation.

The multipart upload process can be implemented using a multi-step process, including an initiation phase for the upload, followed by the uploading phase to upload the parts of the content object, followed after all parts have been uploaded by a completion phase to reassemble the content object.

The issue addressed by the current disclosure is that in conventional systems, the content object becomes accessible only after the third phase, where upon receiving the entirety of the complete multipart upload, the cloud storage system (such as Amazon S3) constructs the content object from the uploaded parts. The user or other downstream consumers will therefore need to wait until this point before accessing the cloud-based copy of the content, after the content object has been fully constructed from the complete set of parts.

As previously noted, what this means is that during the interval of time needed to upload the entirety of the content, the downstream consumers will be unable to download that content. This causes delays in the processing of that content by the desired consumers of the content. In addition, this delay effectively creates a bottleneck to any processing workloads that are dependent upon getting access to that content.

However, embodiments of the present invention solve this problem by providing a read module 132 that permits a user or other entity to access the content object 142 before the entirety of the multiple parts for that content object have been fully uploaded to the cloud storage system. This module may be referred to herein interchangeably and without limitation as either an "active read" module or a "live read" module. The invention allows reads to occur for portions of the content object while the multi-part upload process is still happening. Therefore, a download system 150 can use the active/live read functionality to begin reading from the uploaded content 142 while the uploader is still in the midst of uploading that content object to the cloud storage system. As described in more detail below, this functionality is implemented by tracking the parts of that content object that have been uploaded, and using that tracking information to identify and/or estimate whether certain parts or byte ranges within the content object are available for read access in the intermediate time period before the upload has completed.

This functionality can be especially helpful to provide faster access to very large files, which can be hundreds of GBs to multiple TBs in size. Since it can take hours to fully upload such large files via a multipart upload process, any processing of these objects in a conventional system is delayed until the multipart upload is complete. The present invention serves to reduce this delay by providing the ability to read data from an object while that object is being uploaded, which helps optimize the workflow for efficiency and mitigates delays caused by the time-consuming nature of large file uploads, even in the presence of robust network bandwidth.

Figure 2:
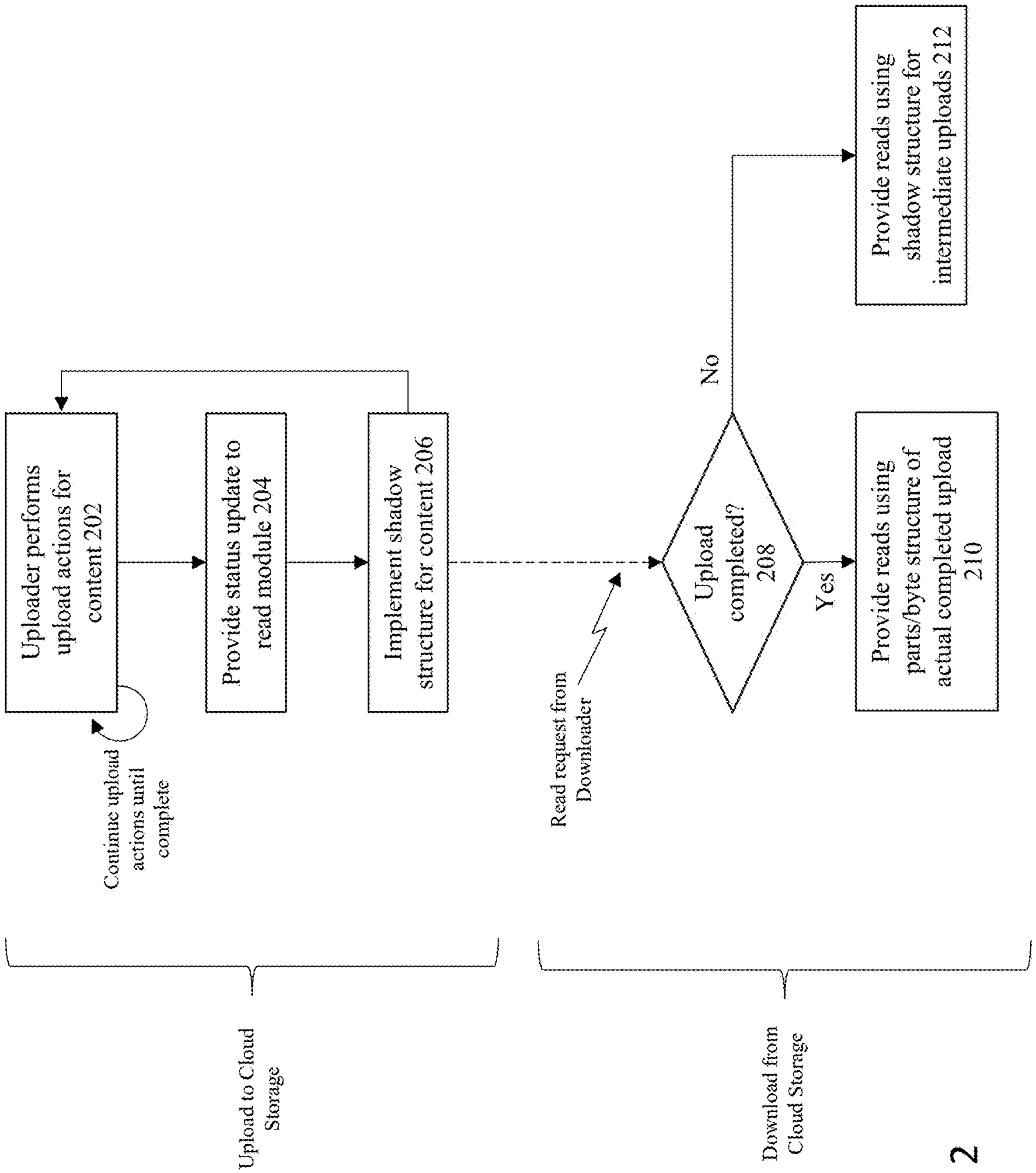
FIG. 2 shows a high-level flowchart of an approach to implement some embodiments of the invention.

FIG. 2 shows a high-level flowchart of an approach to implement some embodiments of the invention. At 202, the uploader performs upload actions to upload a content object to the cloud storage system. As previously noted, a multipart upload process may be employed to upload the content object. During a multipart upload initiation phase, when a request is sent to initiate the multipart upload, the cloud storage system may return a response with an upload ID, which is a unique identifier for multipart upload. This upload ID value is used to identify the current upload processing job, and is also used to interact with the cloud storage system for this job. When uploading a part, in addition to the upload ID, a part number is also specified to the cloud system. A part number uniquely identifies a part and its position in the object that is being uploaded. It is noted that the uploader and/or cloud storage system does not necessarily require a consecutive sequence of part numbers to be chosen for upload, particularly since parts may be uploaded in parallel. What this means is that parts may be uploaded in an out-of-order manner at the cloud storage system, and at various intermediate stages of the loading process, may have gaps in the sequential series of parts numbers that have been uploaded.

In general, the upload actions continue until the entirety of the content object has been uploaded. When a multipart upload has completed, the cloud storage system will create an object by concatenating the parts in ascending order based on the part number. If any object metadata was provided in the "initiate multipart" upload request, the cloud storage system will associate that metadata with the object. After a successful "complete" request, the individual parts themselves will no longer exist.

At 204, during the intermediate time periods when the upload has not yet completed, status updates may be provided to the read module. These status updates are provided to identify which of the parts have successfully been uploaded to the cloud storage system. The upload ID can be used to identify the specific multipart upload job for which information is desired of the uploaded parts.

At 206, a shadow structure is maintained to track the various parts of the content object for the multipart upload. In the simplest case, this structure will merely track the specific parts numbers that have already been uploaded. In a more complicated scenario, this shadow structure is used to estimate the byte ranges for the different parts. This allows the read module to determine whether any given byte range for a read request falls within a range of byte values for parts that have already been uploaded, versus a byte range for a read request that corresponds to parts that have not yet been uploaded.

It is noted that either an active approach or a passive/reactive approach may be taken to track the status of the parts uploads. In FIG. 2, the shadow tracking structure that is described may be implemented as an active system that proactively maintains the structure. In an alternative embodiment, a reactive approach can be taken, where the shadow parts list is generated using tracked data of uploaded parts upon the receipt of a download/read request from a user or other data consumer. While various illustrative examples described herein may relate to either an active or reactive approach, it is noted that both approaches fall within the scope of the inventive concepts described in this document.

In some embodiments, the shadow structure is the same structure already being used and maintained by the cloud storage system to track the uploads for the parts of the multipart upload. As such, no additional structure needs to be created in this approach to track the uploads/partial uploads. Instead, usage of that shadow structure serves additional duties for the current active/live read process. In an alternative embodiment, the shadow structure is maintained separately from other structures otherwise used by the cloud storage system to manage its uploads. In this situation, the pertinent contents of the shadow structure can be discarded after the upload process has completed.

At some point along the way, a read request may be received from a downloader entity. At 208, a determination is made whether the upload process has already completed. If the answer is "yes", then at 210, the reads request is fulfilled using the actual completed content object that was fully uploaded.

However, if the answer is "no", then the read request has been received during an intermediate stage of the upload process and hence the content object has not yet been fully uploaded. Therefore, at 212, reads are provided using the shadow structure for such intermediate uploads.

The read requests may be in a form where specific part numbers are requested. In contrast, the read request may also be posed as a request for a specific byte offset within the content object. The way that the read module handles these different types of read requests are separately described in FIG. 3 and FIG. 4.

Figure 3:
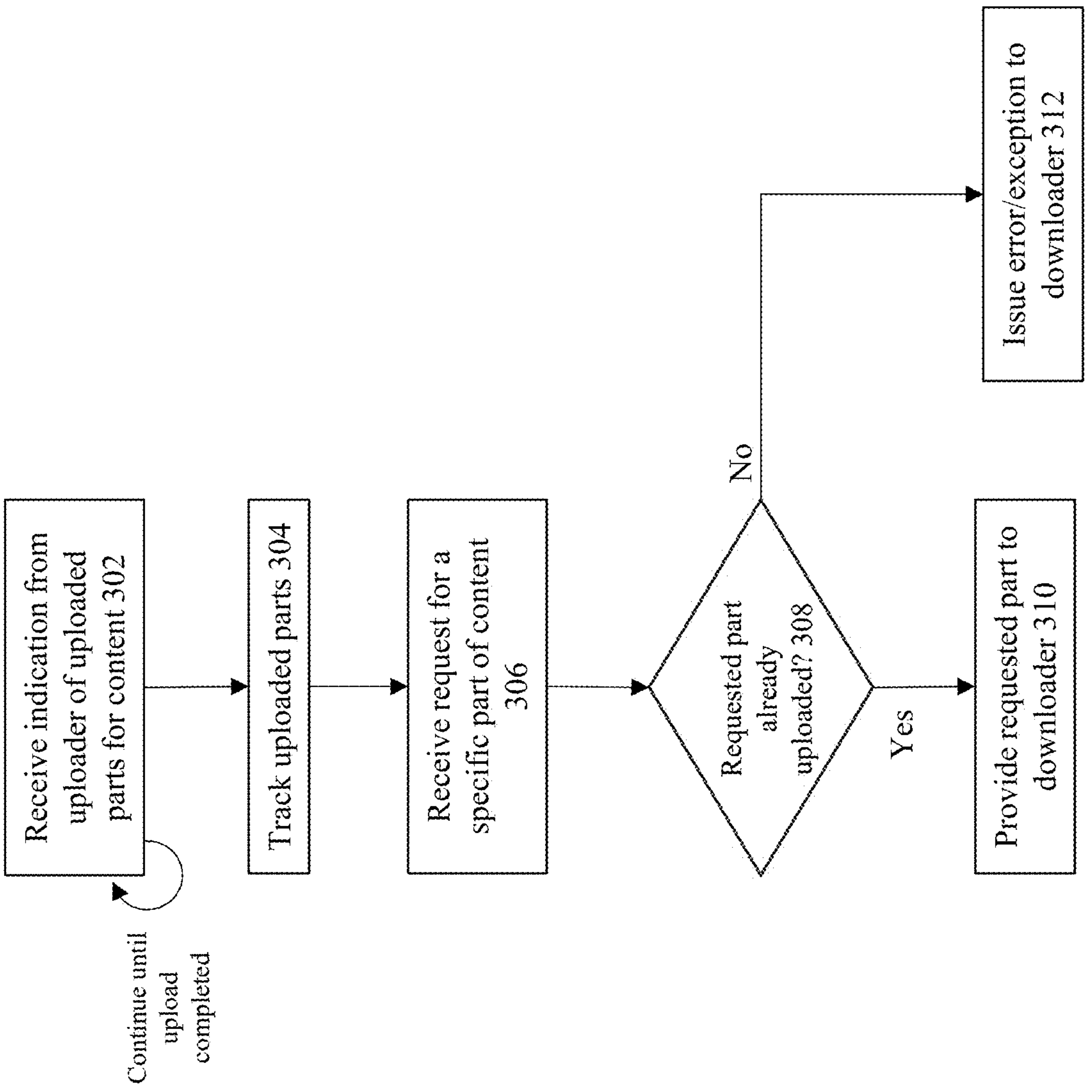
FIG. 3 shows a flowchart of an approach to implement reads where the read request is in a form where a specific part number is identified.

FIG. 3 shows a flowchart of an approach to implement reads/downloads where the read request is in a form where a specific part number is identified. At 302, an indication is received from the uploader of the status of the uploading process for the multiple parts. In particular, an identification is made of the parts that have already been uploaded. At 304, the status of the uploaded parts is then tracked, e.g., in a shadow structure.

At 306, a read request may be received that specifically identifies a part number for the read request. A determination is made at 308 whether the requested part has already been uploaded. If so, then at 310, that requested part can then be read and provided to the downloader. If not, this means that the requested content part does not yet exist or is not yet in a usable form at the cloud storage system. Therefore, if the part has not yet been uploaded, then at 312, an error and/or exception message is provided back to the requestor to indicate that the read request has failed.

As can be seen, the situation where the read request specifically identifies a part number is relatively straightforward, since the system is already tracking the uploaded parts based upon the part numbers. The situation becomes more complicated when a read request is in a form that identifies the requested content based upon a byte offset or a byte range. In this scenario, additional steps are taken to address these types of read requests.

Figure 4:
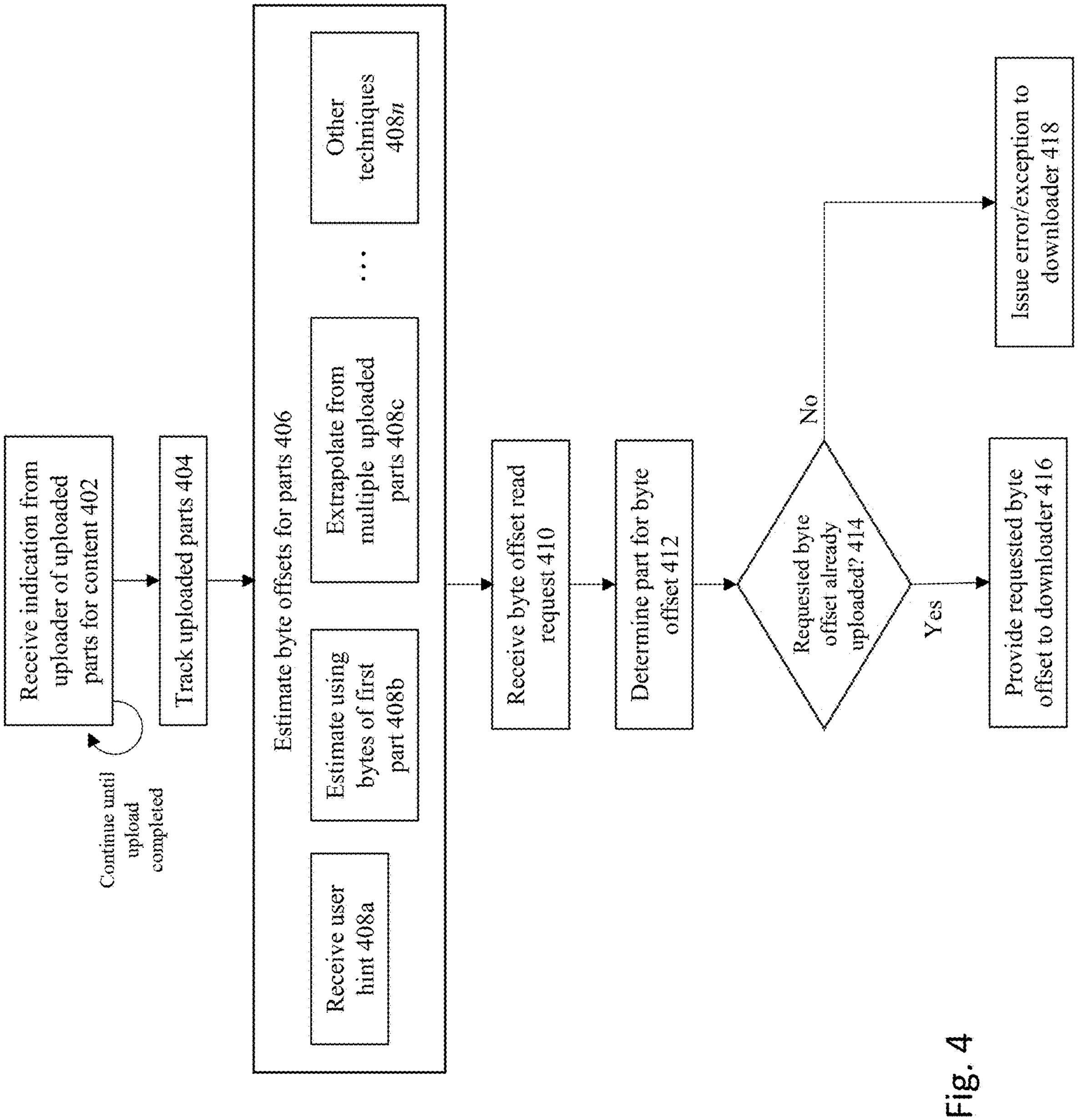
FIG. 4 shows a flowchart of an approach to implement reads where the read request is in a form where a specific byte range is identified.

FIG. 4 shows a flowchart of an approach to implement reads/downloads where the read request is in a form where a specific byte range is identified. At 402, an indication is received from the uploader of the status of the uploading process for the multiple parts. Identification is made of the parts that have already been uploaded. At 404, the status of the uploaded parts is then tracked, e.g., in a shadow structure.

At this point, at 406, estimates are made of the offsets for the various parts for the content object. The reason is that since the system is providing an indication of upload status by identifying part numbers that have been uploaded, and may not provide byte ranges for those uploaded parts, the current embodiment will itself take steps to try and identify byte range values for the various parts.

There are numerous approaches that can be taken to estimate the byte offset values for the parts. At 408*a*, one possible way is to use a hint provided from the user and/or uploader. The hint may identify exact byte offset ranges for each and every one of the parts. Alternatively, the hint may provide an estimated byte offset that is to be used to estimate the byte ranges, even if not guaranteed to exactly correspond to the actual byte range for each part.

At 408*b*, another possible approach is to estimate the byte range using the actual byte values for the first part in the sequence of parts. This approach takes the exact byte range for the first part and makes an assumption that every other part will uniformly have the same number of bytes as the first part. For example, if the first part is exactly 1 GB in size, then the shadow structure can associate an estimated byte range of 0-1 GB for the first part, 1-2 GB for the second part, 2-3 GB for the third part, etc., continuing onwards for each of the parts tracked in the shadow structure.

At 408*c*, yet another approach is to extrapolate the estimated byte offset ranges based upon multiple parts that have already been uploaded. For example, an average can be taken of the size of the already uploaded parts, and that average value used to estimate the byte ranges of subsequent parts within the sequence of parts.

It is noted that the inventive concepts described herein may encompass these and even other techniques 408*n* that may be used to estimate byte ranges for the parts, and the invention is thus not to be limited to any particular technique unless specifically claimed as such.

At 410, a read request may be received from a downloader with respect to a specific byte offset value. At 412, a determination is made of the part(s) that correspond to the byte offset in the read request. This action can be implemented by checking the shadow structure to identify which of the parts fall within the byte value(s) or range(s) in the read request.

At 414, a check is made whether the requested byte offset corresponds to one or more parts that have already been uploaded. If so, then at 416, that requested byte offset range can be read and provided to the downloader. If not, this means that the requested content part does not yet exist or is not yet in a usable form at the cloud storage system. Therefore, if the part(s) that correspond to the byte range have not yet been uploaded, then at 418, an error and/or exception message is provided back to the requestor to indicate that the read request has failed.

Figure 5A:
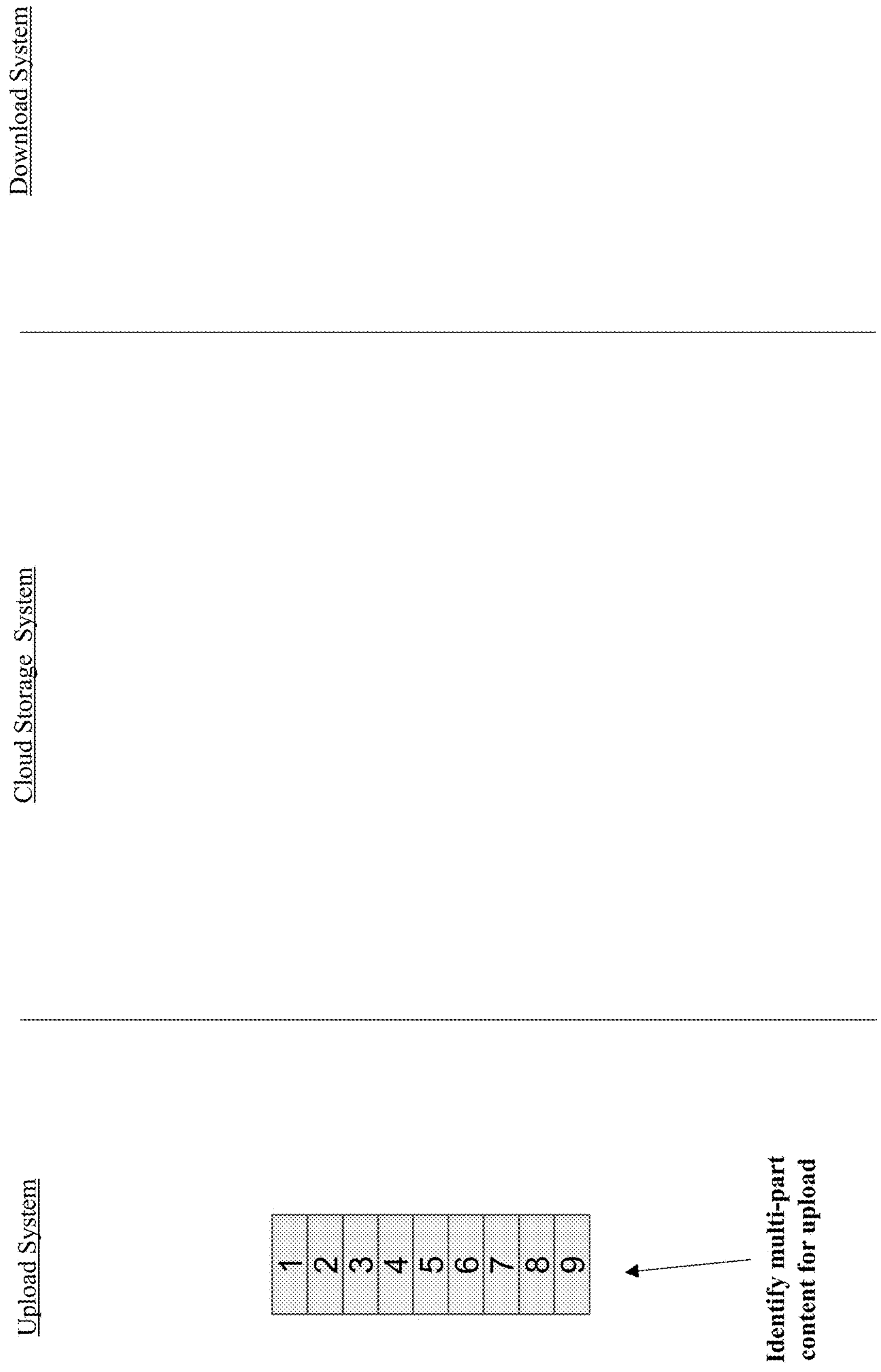
FIGS. 5A-L provide illustrative examples of certain embodiments of the invention.
Figure 5B:
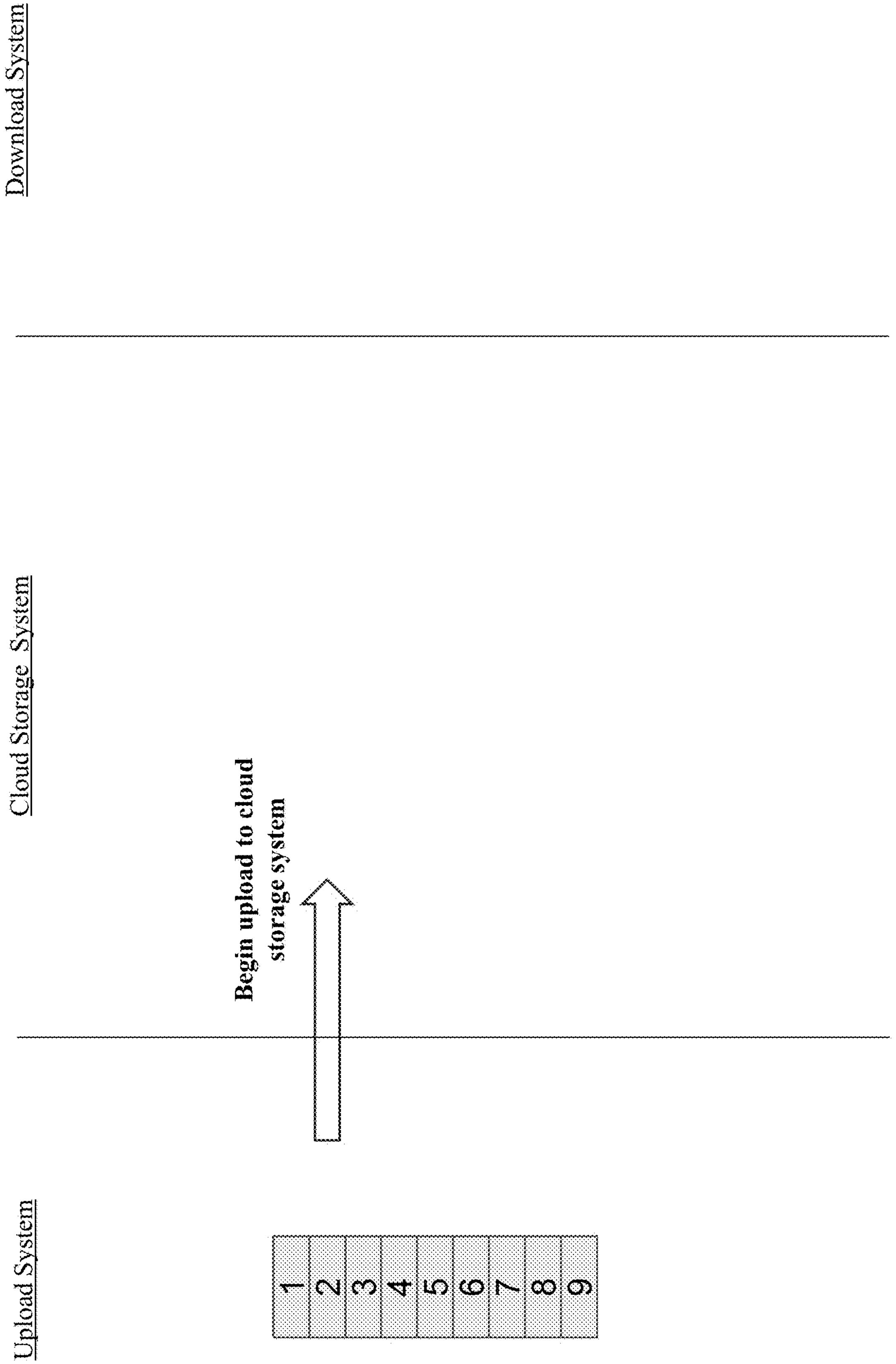

FIGS. 5A-L provide illustrative examples of certain embodiments of the invention. FIG. 5A shows the original content object at the user system. From a multipart perspective, the content object corresponds to parts 1-9. As shown in FIG. 5B, an upload process may be initiated to upload the content object to a cloud storage system.

Figure 5C:
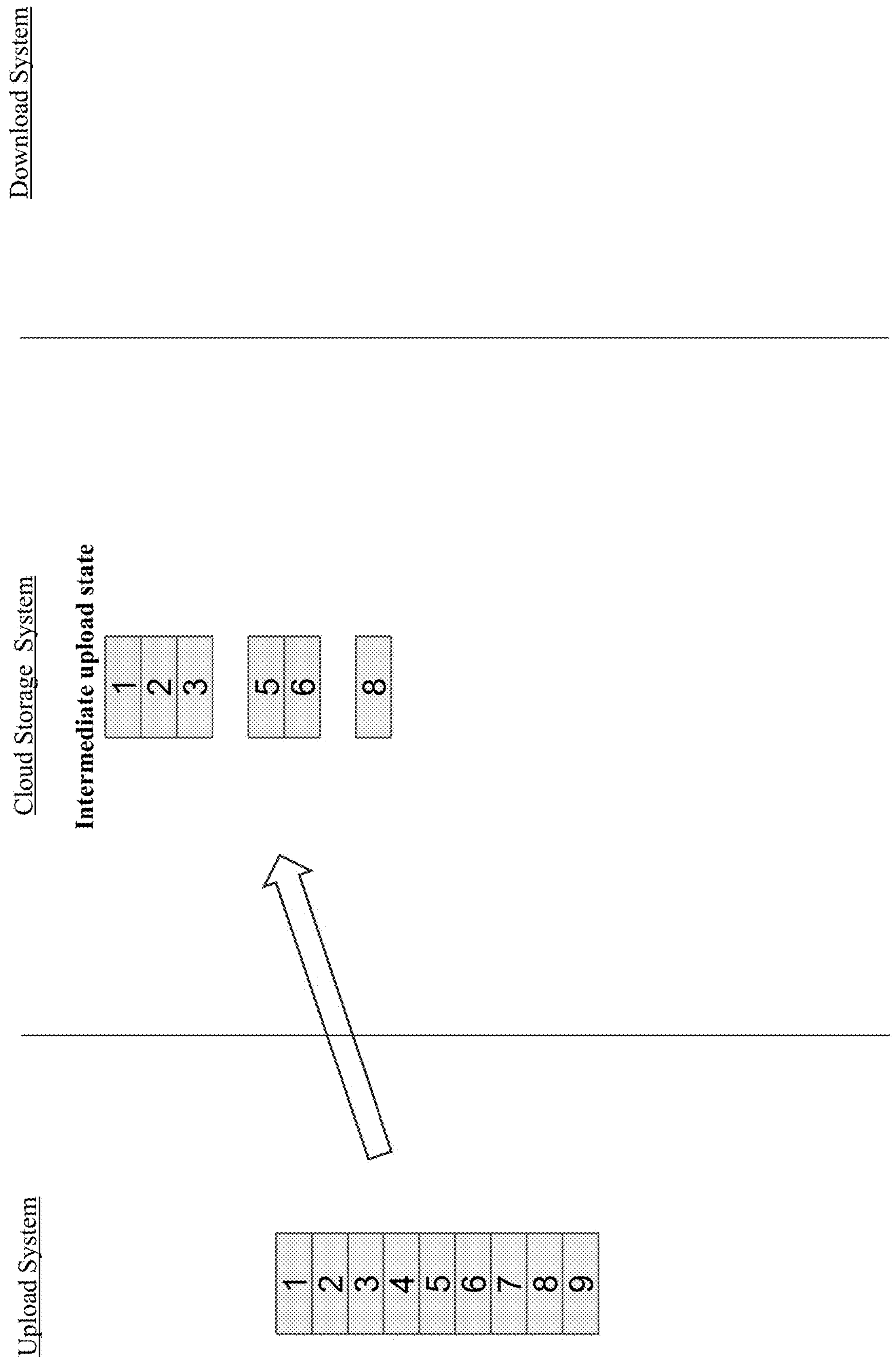

FIG. 5C shows an intermediate stage of the multipart upload process. Here, the intermediate upload state of the process is that parts 1-3, 5-6, and 8 of the object have been uploaded already to the cloud storage system. However, parts 4 and 7 have not yet been uploaded.

Figure 5D:
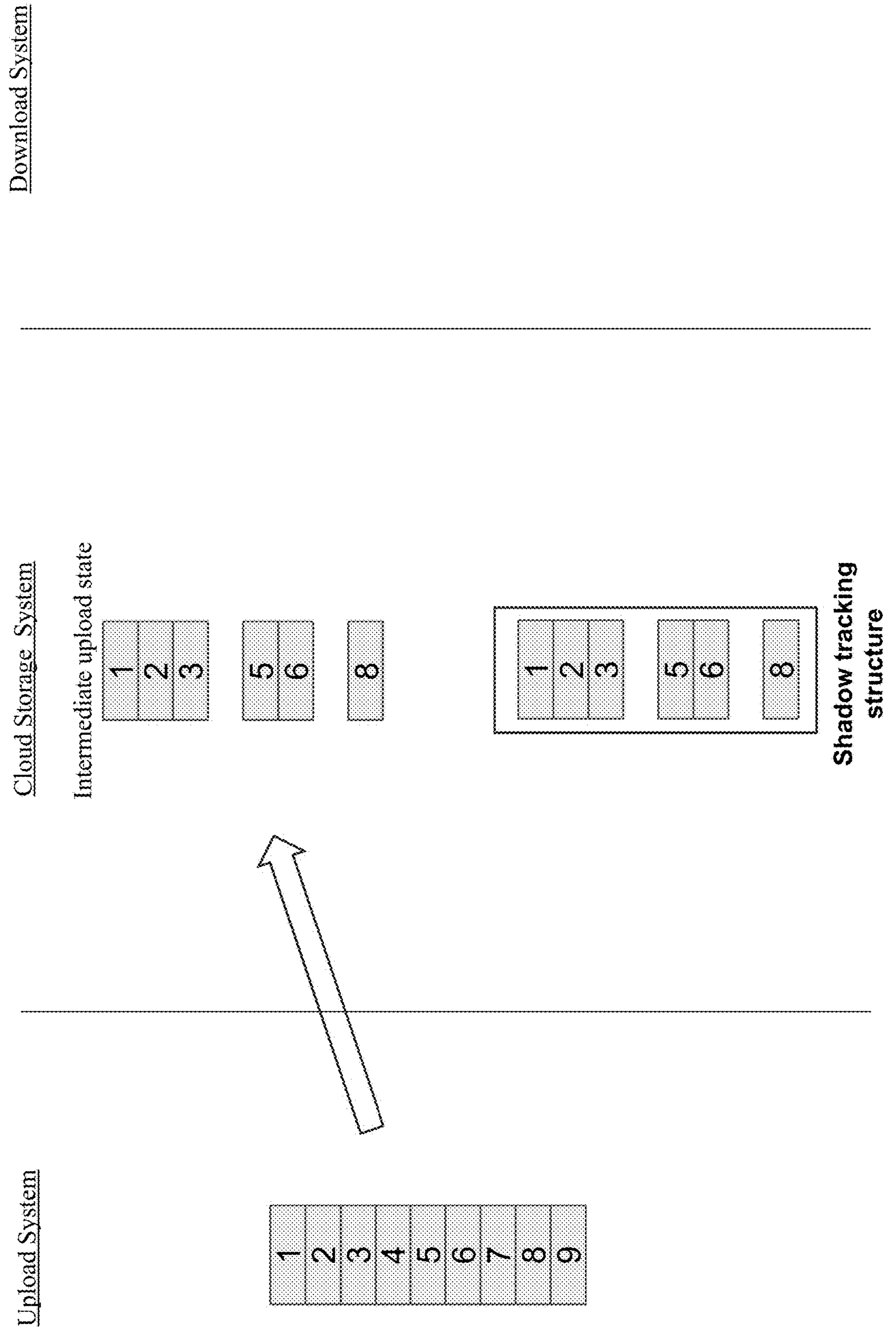

As shown in FIG. 5D, a shadow structure may be used to track the uploaded parts. Here, the shadow structure is configured to identify parts 1-3, 5-6, and 8 of the object as having already been uploaded to the cloud storage system.

Figure 5E:
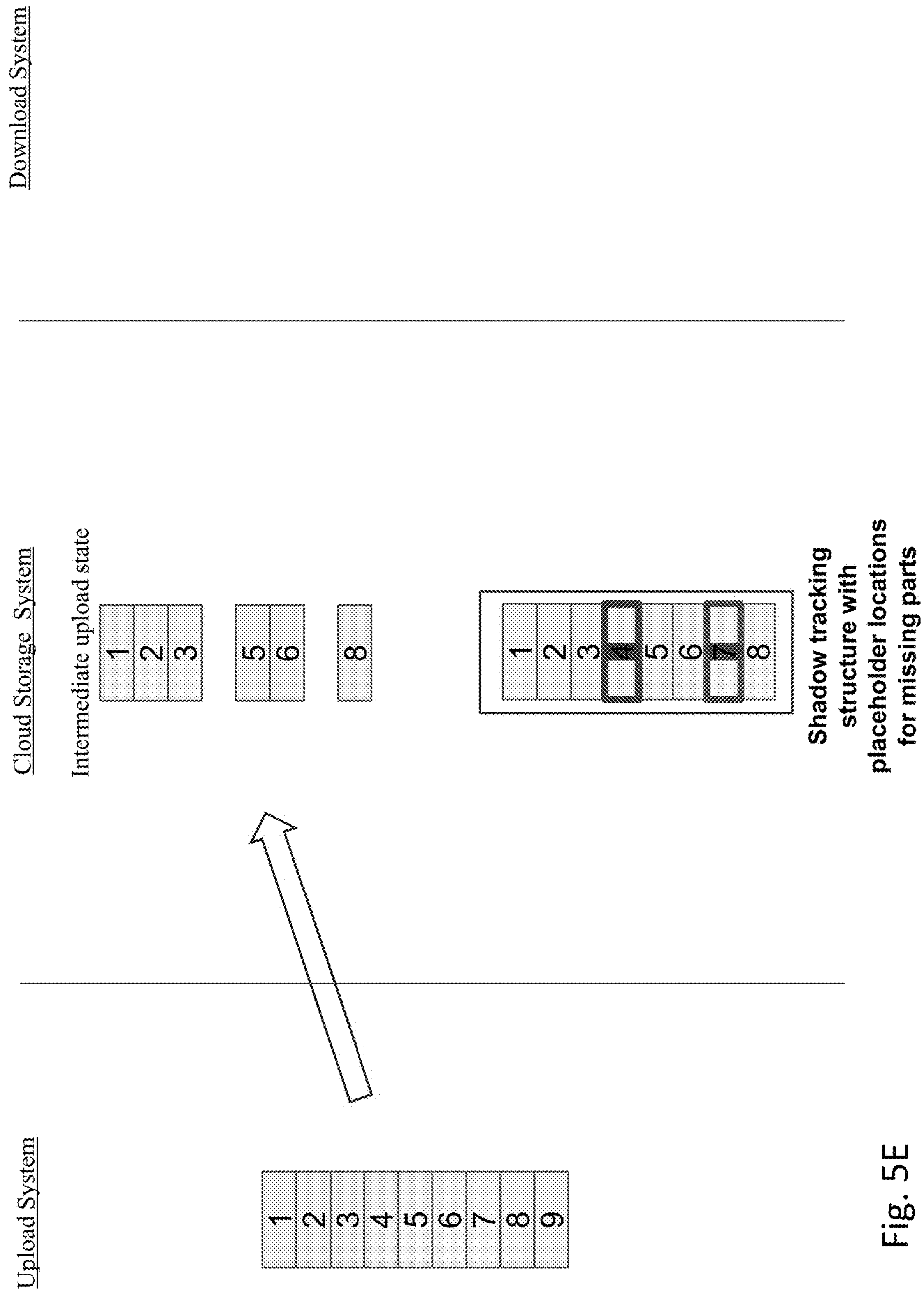

As shown in FIG. 5E, the shadow structure may also be configured with placeholder locations to identify information about the parts that have not yet been uploaded, including status information indicative of their status as non-uploaded parts.

Figure 5F:
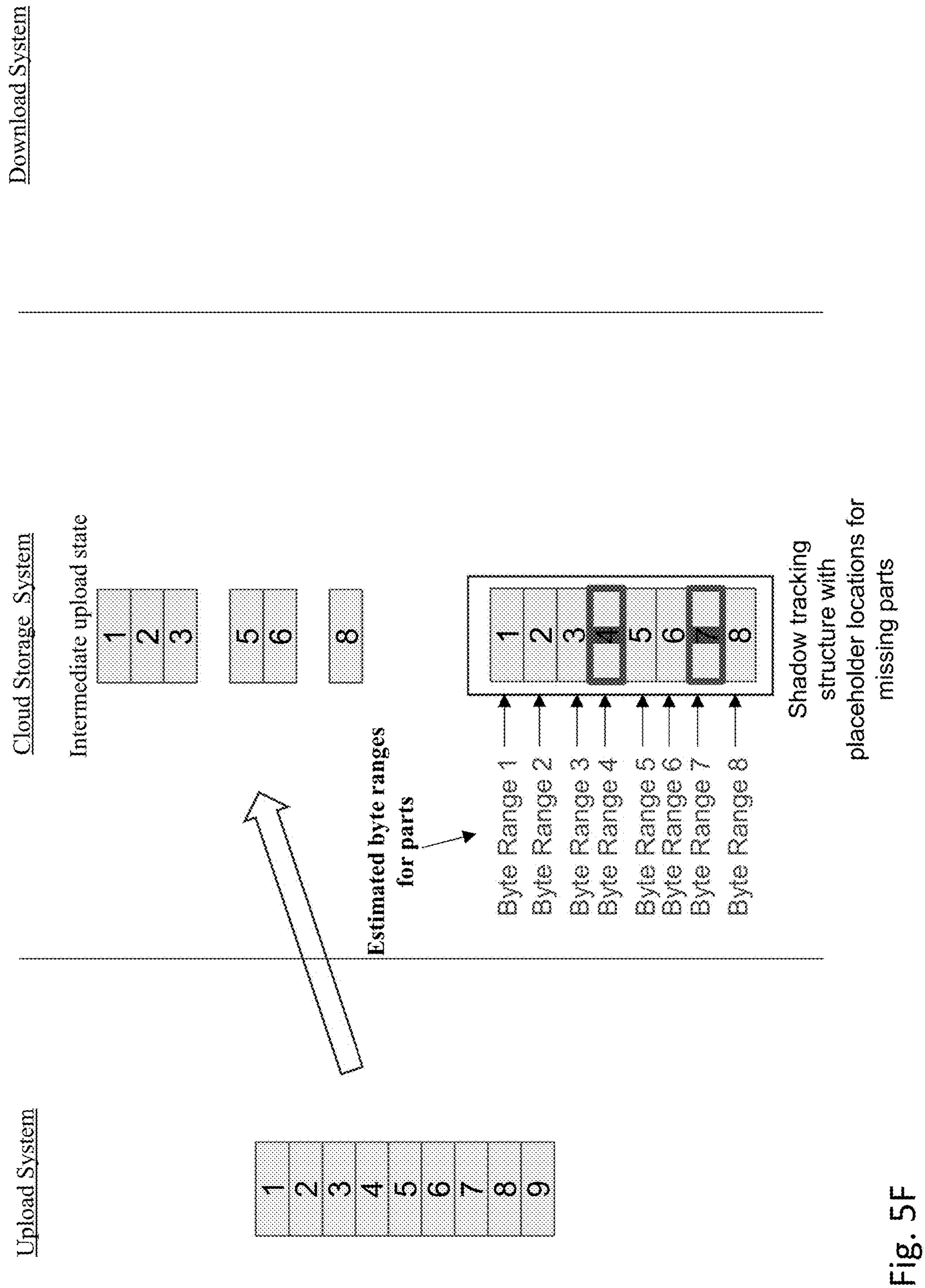

In addition, as shown in FIG. 5F, the structure can also be used to track the estimated byte ranges for the different parts. Any suitable approach can be taken to estimate the byte ranges. This is particularly important for the parts that have not yet been uploaded. Since the non-uploaded parts do not yet exist in a useable form at the cloud storage system, this means that the system may not know of the byte range that should be associated with these missing parts. As such, embodiments of the invention will make certain assumptions to derive an estimate of the byte range for the missing parts. The end result is that the shadow structure will include an estimated byte range for every pertinent part, even if that part has not yet been uploaded.

Figure 5G:
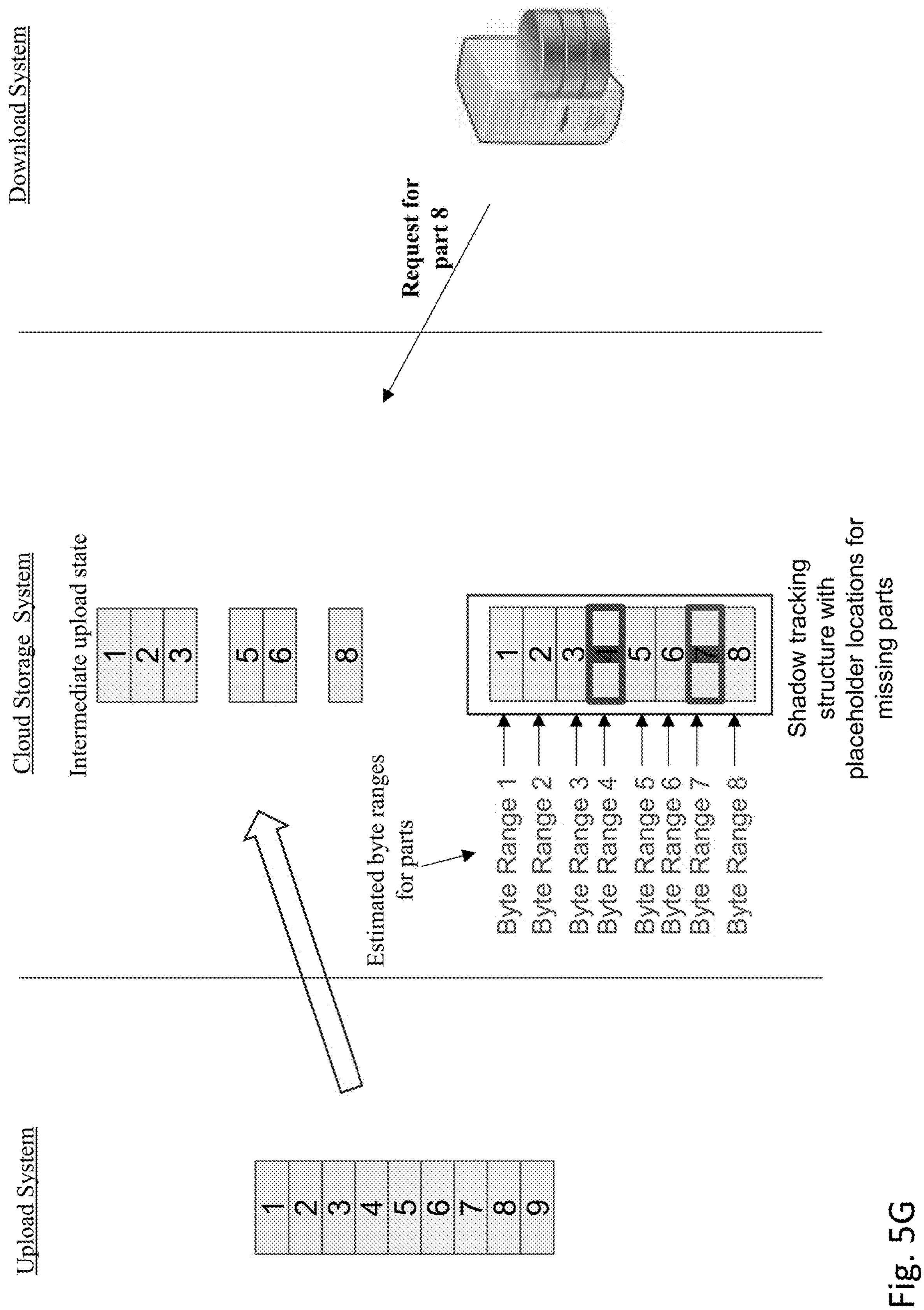
Figure 5H:
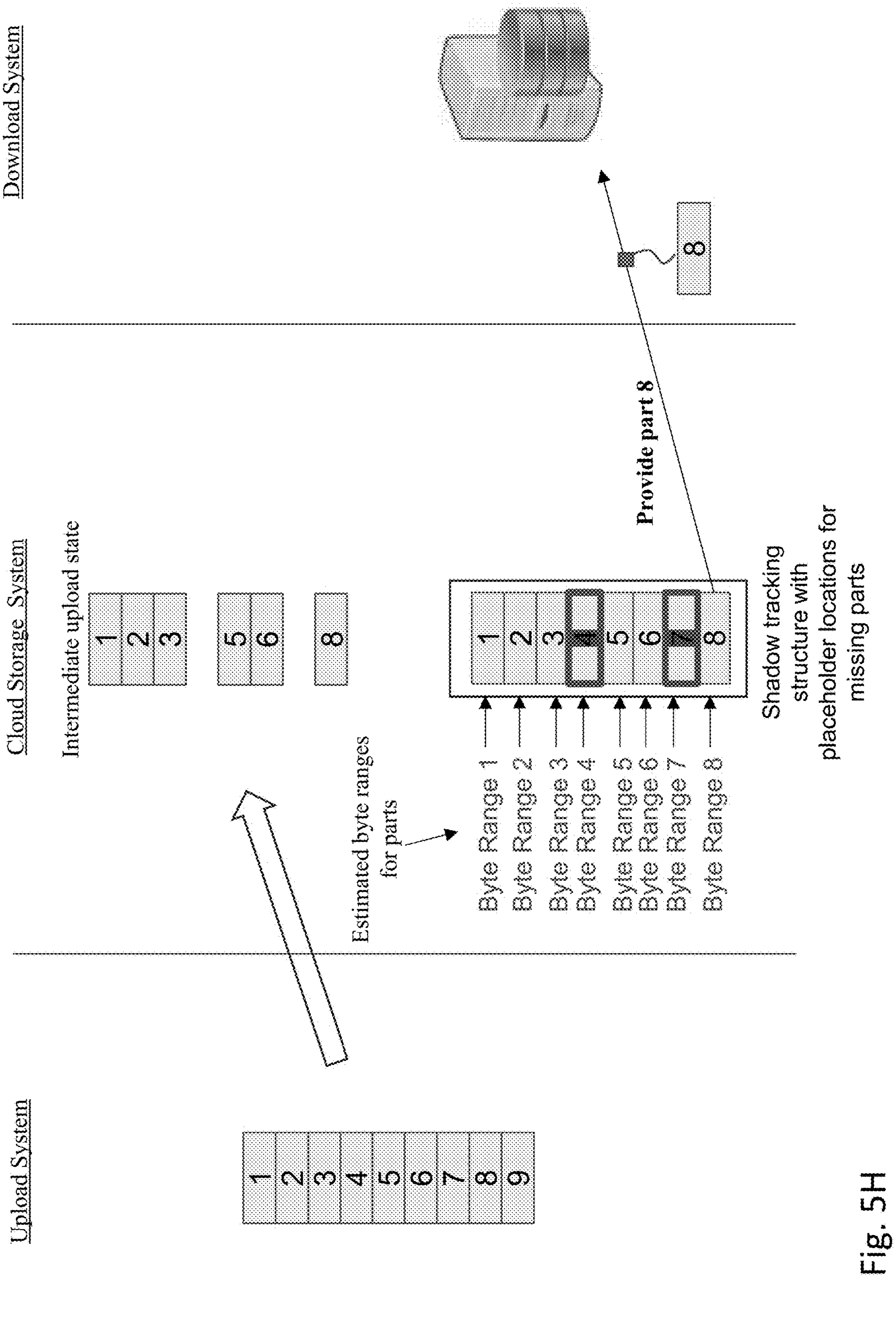

FIG. 5G shows the situation where a downloader issues a read request that specifically identifies a part number in the request. Here, the example shows that the read request is requesting part 8 to be downloaded. As shown in FIG. 5H, this part number can be checked against the shadow structure to determine whether it is already uploaded. Since part 8 has already been uploaded, this means that the part can therefore be provided to the downloader in response to the read request.

Figure 5I:
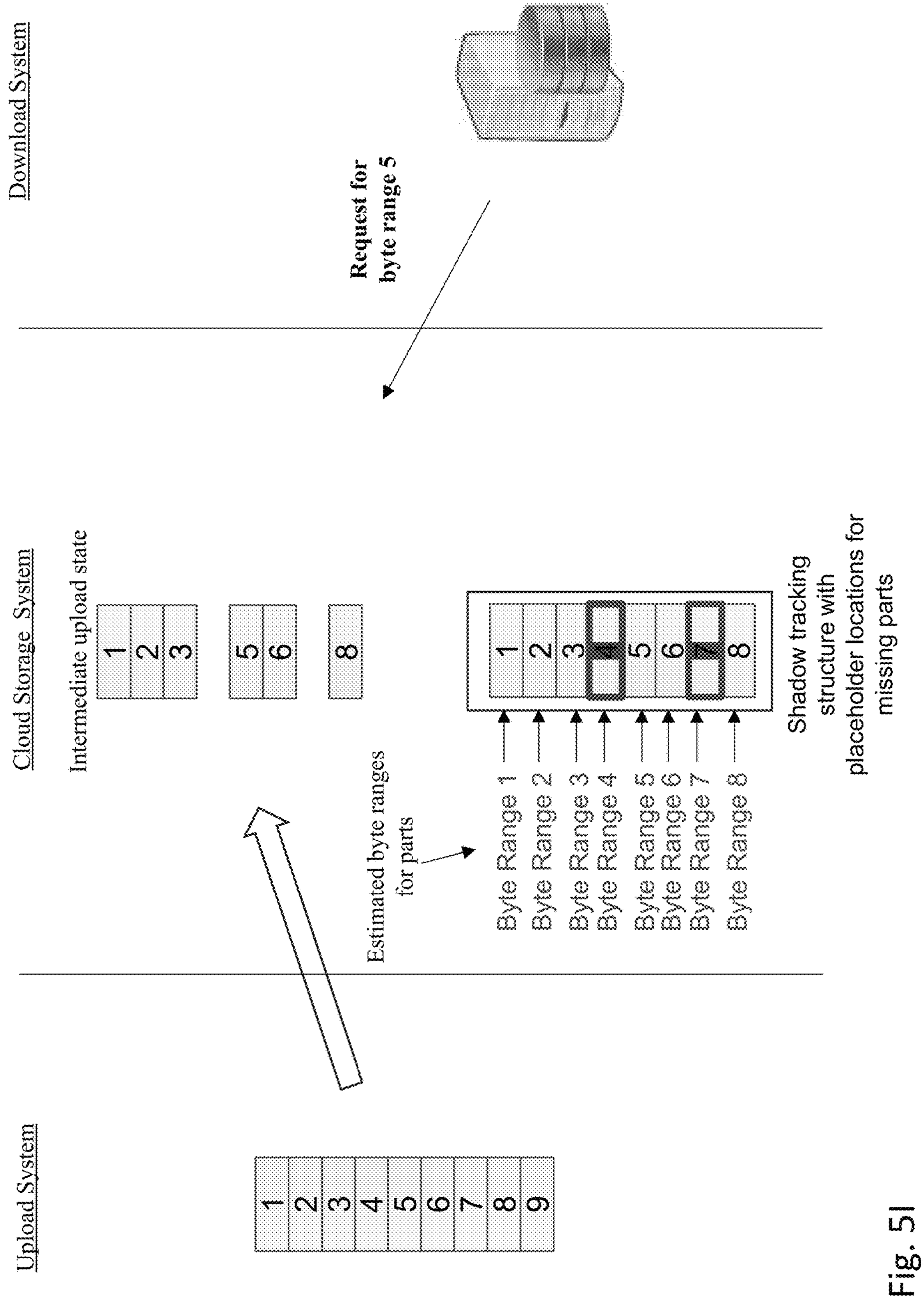
Figure 5J:
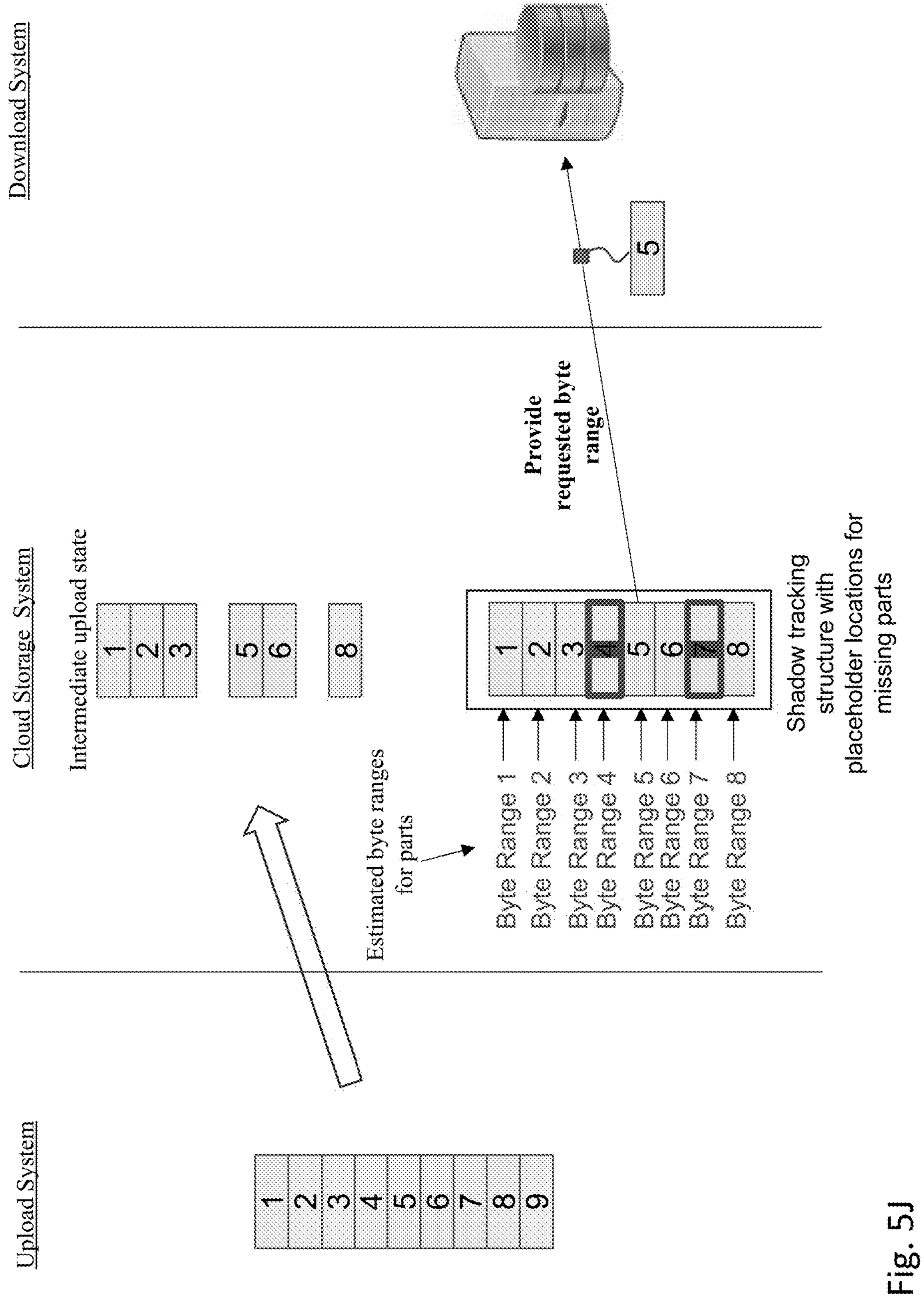

FIG. 5I shows the situation where a downloader issues a read request that specifically identifies a byte range in the request. Here, the example shows that the read request is requesting a byte range to be downloaded (byte range 5). As shown in FIG. 5J, this byte range can be checked against the shadow structure to determine which part is associated with this byte range. Here, byte range 5 is shown to be associated with part 5. Since part 5 has already been uploaded, this means that the requested byte range can therefore be provided to the downloader in response to the read request.

Figure 5K:
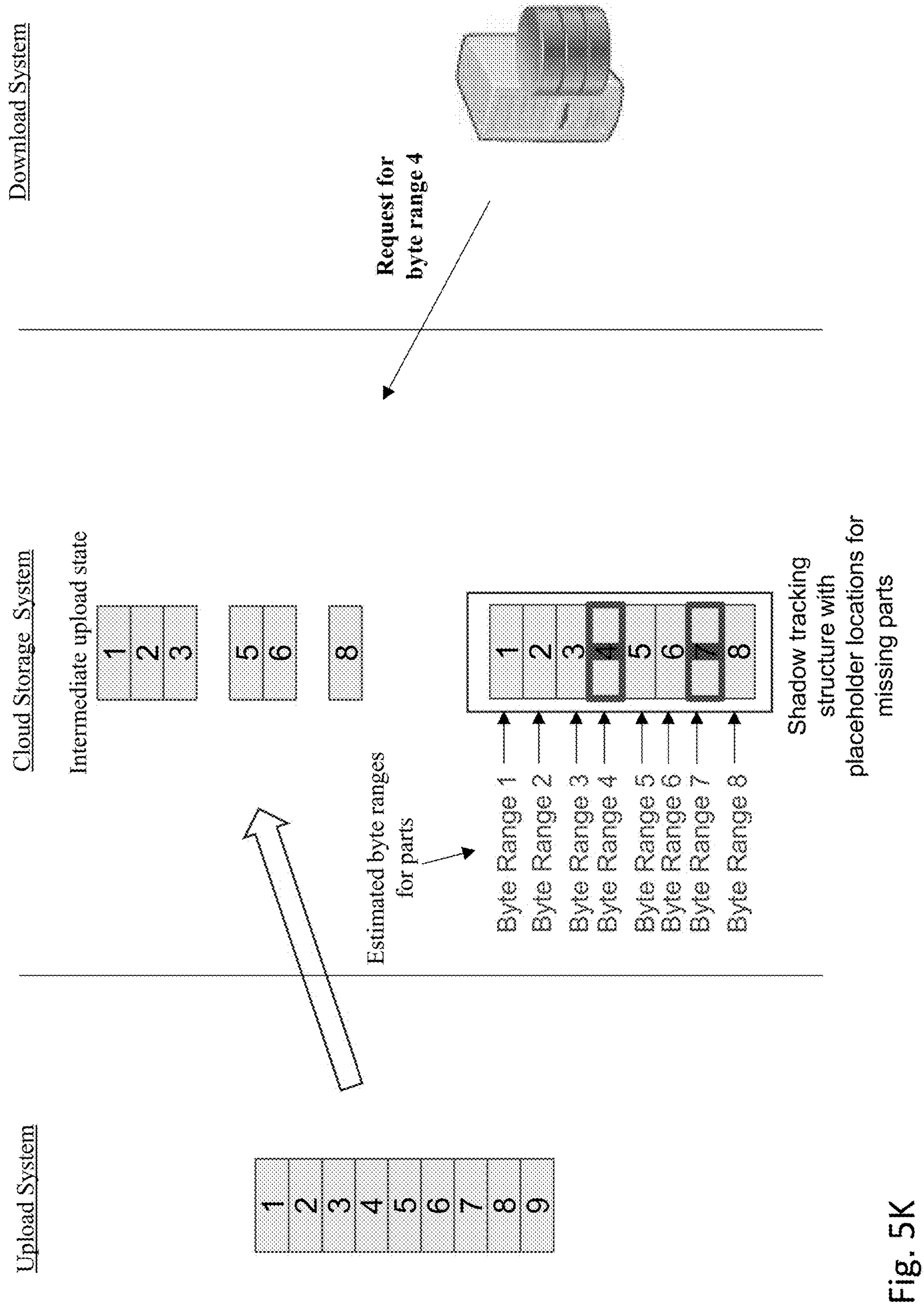

In FIGS. 5I and 5K, the download request is illustrated as being for a byte range that falls within and/or correlates to one or more part numbers. It is noted that at this intermediate stage, only the uploader entity would know with certainty exactly which part corresponds to which byte range for partially uploaded content. The downloader and cloud storage system entities do not yet have sufficient knowledge to authoritatively map the range request to specific parts. Instead, as shown in these figures, the cloud storage system entity leverages the system being illustrated to make a reasonable inference as to the mapping. This reasonable inference is then used to either deny the request or to provide the requested byte range from an uploaded part.

Figure 5L:
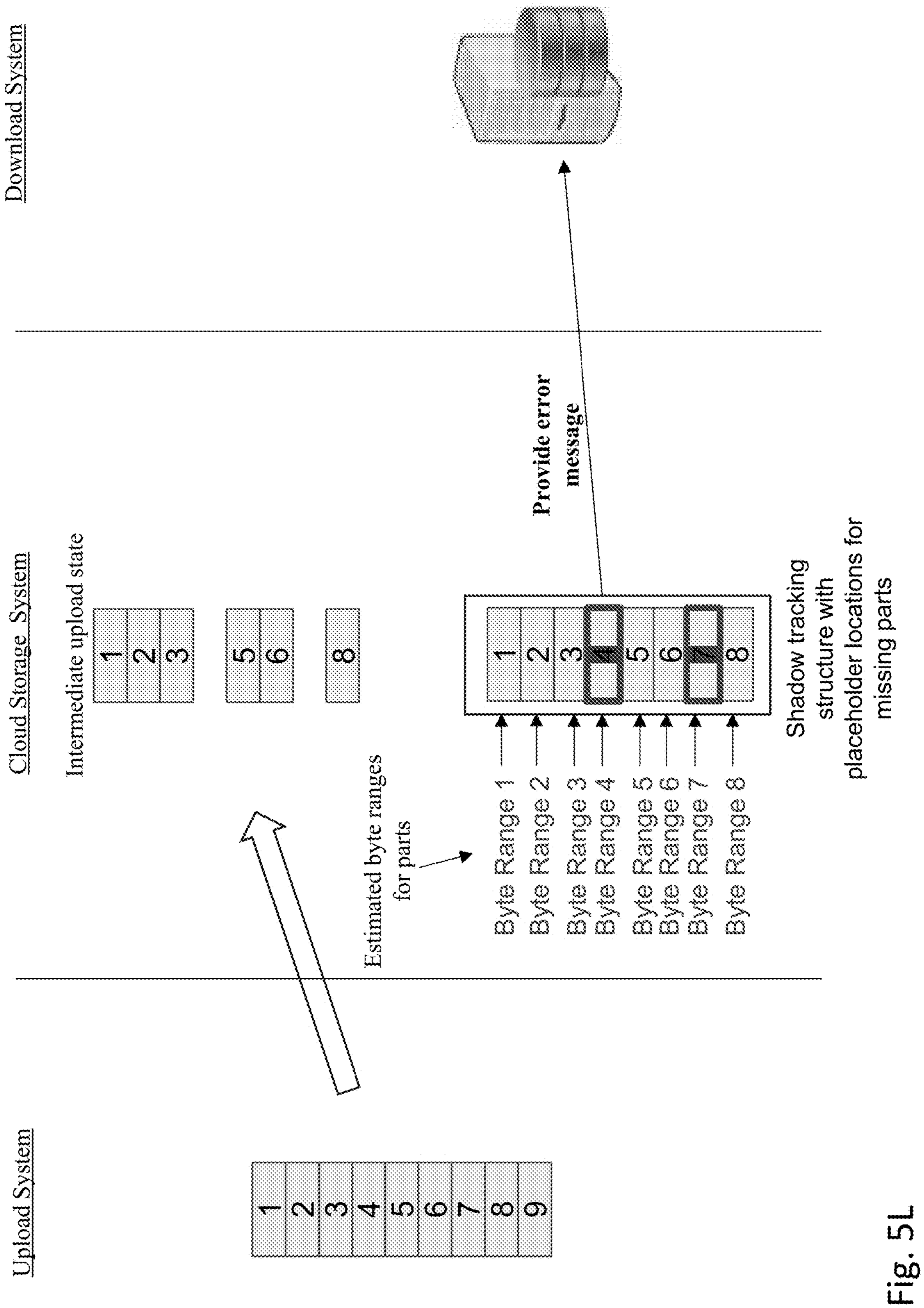

FIG. 5K shows the situation where a downloader issues a read request that specifically identifies another byte range. Here, the example shows that the read request is requesting a byte range to be downloaded (byte range 4). As shown in FIG. 5L, this byte range can be checked against the shadow structure to determine which part(s) are associated with the desired byte range. Here, byte range 4 is shown to be associated with part 4. Since part 4 has not yet been uploaded, this means that the requested byte range cannot be provided to the downloader in response to the read request.

This document will now provide additional information for implementation of illustrative examples according to some embodiments of the invention. In some embodiments, the active/live read functionality may be specified using custom headers for an API. The custom header may be used to indicate that the inventive functionality is to be enabled for the user.

In some embodiments, the API call to perform an upload has no public behavior change when used to upload parts to an active/live read enabled upload. However, if the multipart uploads do not meet the following assumptions, then the read API calls specifying a byte range may not produce results which match user expectations. These assumptions may include one or more of the following: (a) all parts, except the last one, should be the same size; (b) no part numbers should be skipped; (c) the first part number should be part 1; (d) the last part should not be uploaded first.

In some embodiments, the API call to complete a multipart upload has no public behavior change when used on an active/live read enabled multipart upload. However, if a user is currently leveraging the invention and the object is completed with a sequence of part numbers which do not meet certain requirements, then subsequent GetObject calls may not return the same data as they did previously. These assumptions may include one or more of the following: (a) all parts, except the last one, should be the same size; (b) no part numbers should be skipped; (c) the first part number should be part 1.

In some embodiments, the API call to get an object may be modified to address the inventive read situation. If GetObject is called with a file name and either a part number or a byte range, then if the most recent object matching the file name is an active/live read enabled incomplete multipart object, the available part data will be checked against the request, and (a) if the GetObject data request can be satisfied, the data will be returned; (b) if the GetObject data request cannot be satisfied, a 416 error will be returned. If the most recent object matching the file name is not a multipart object or is a completed multipart object, there will be no behavior change. If the most recent object matching the file name is an incomplete multipart object which was not created with active/live read enabled, then the next most recent matching object will be checked until a valid matching object is found or all candidates have been checked (with no behavior change in this case).

It is noted that the active/live read feature allows the GetObject call to download data from an on-going multipart upload and thus has a number of ramifications. For example, the exact same active/live read GetObject request may return different results over time if the upload process replaces certain part numbers with new versions. In addition, an active/live read GetObject request for a byte range may not return the same results as the same GetObject byte range request on the completed object if the upload process does not follow the documented upload part expectations. Furthermore, active/live read GetObject calls which specify a file name but do not specify a version id may switch from one object to another between GetObject calls if a new active/live read enabled multipart upload for the same file name is started. For this reason, the file version id should be included in active/live read GetObject calls.

Therefore, what has been described is an improved approach to provide access to uploaded content even before the entirety of the content has been uploaded to cloud-based storage. This permits the users and/or the users' authorized services or data consumers to read partial data while multipart upload[s] are still in progress. This approach therefore helps to optimize any downstream workflow that relies upon the content for efficiency, which mitigates any delays caused by the time-consuming nature of large file uploads.

System Architecture

Figure 6:
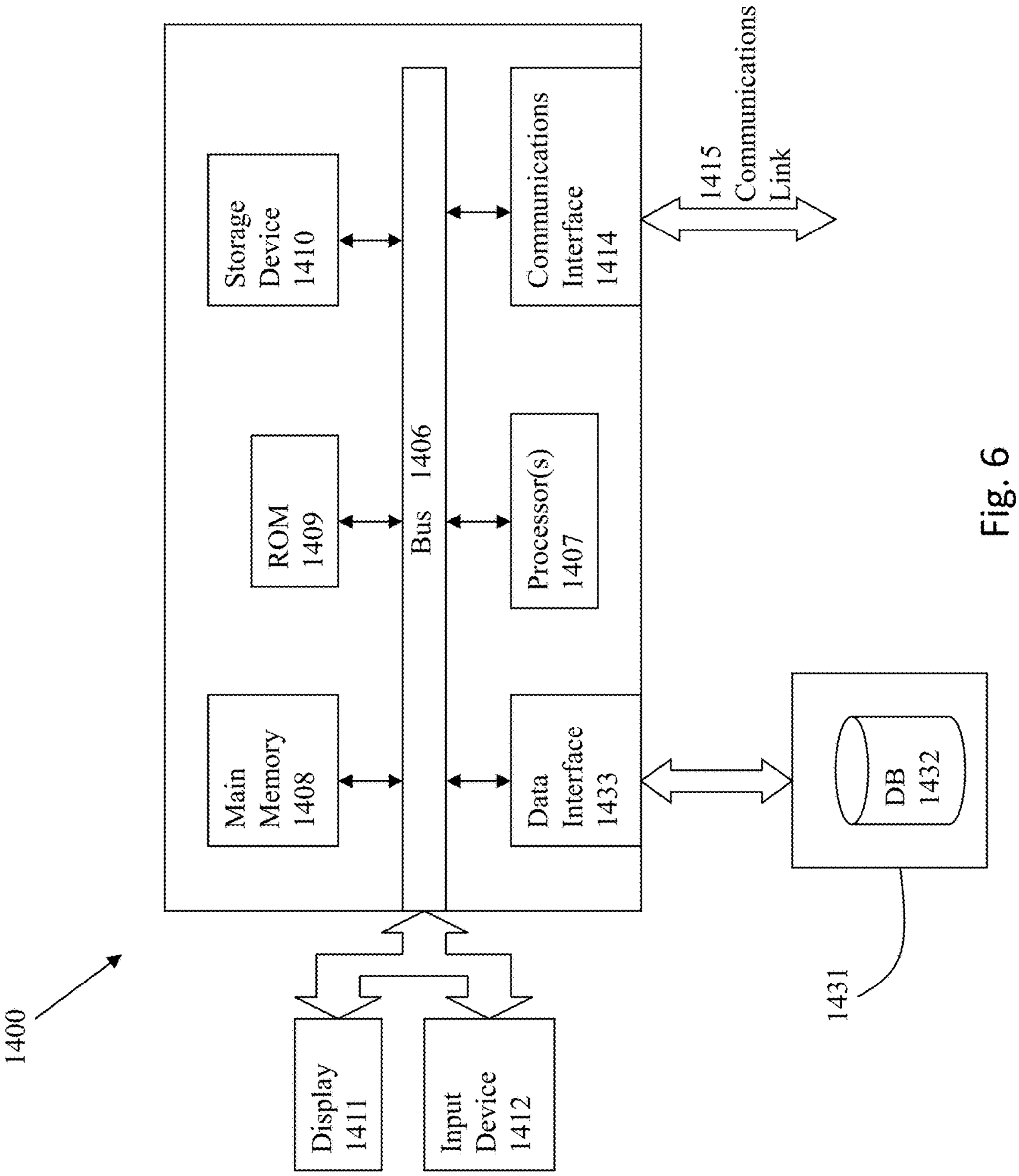
FIG. 6 is a block diagram of an illustrative computing system suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 7:
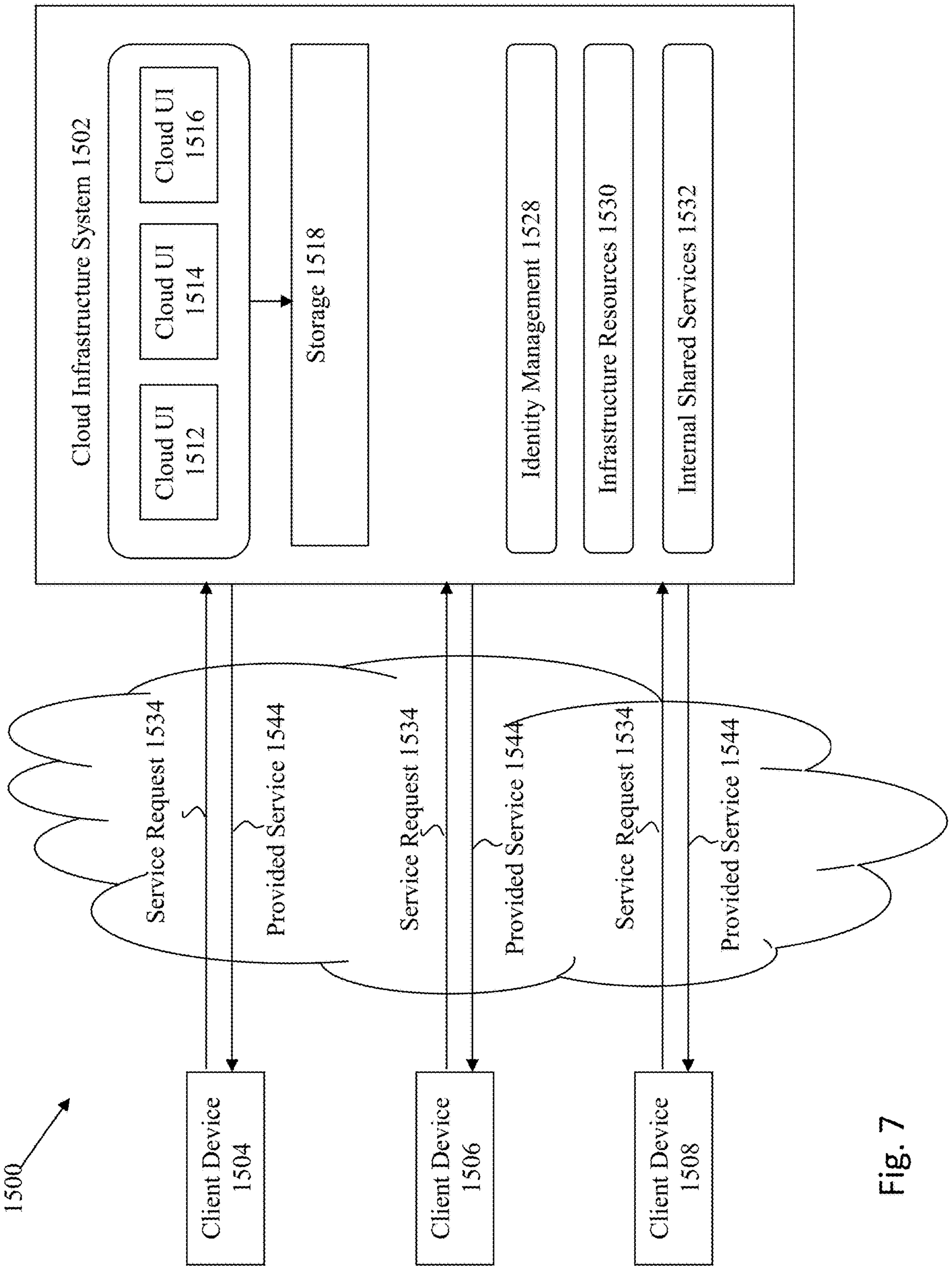
FIG. 7 is a block diagram of one or more components of a system environment in which services may be offered as cloud services, in accordance with an embodiment of the present invention.

FIG. 7 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described above for FIG. 6. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the user's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a user in a self-service, subscription-based, elastically scalable, reliable, highly available, and secure manner.

In various embodiments, cloud infrastructure system 1502 may be adapted to automatically provision, manage and track a user's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A user, via a subscription order, may order one or more services provided by cloud infrastructure system 1502. Cloud infrastructure system 1502 then performs processing to provide the services in the user's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, users can utilize applications executing on the cloud infrastructure system. Users can acquire the application services without the need for users to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Users can acquire the PaaS services provided by the cloud infrastructure system without the need for users to purchase separate licenses and support.

By utilizing the services provided by the PaaS platform, users can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer users a Database as a Service in the form of a database cloud. Middleware cloud services may provide a platform for users to develop and deploy various business applications, and Java cloud services may provide a platform for users to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for users utilizing services provided by the SaaS platform and the PaaS platform.

In certain embodiments, cloud infrastructure system 1502 may also include infrastructure resources 1530 for providing the resources used to provide various services to users of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a user's subscription received by cloud infrastructure system 1502, and the like.

In one embodiment, as depicted in the figure, cloud management functionality may be provided by one or more modules, such as a storage module 1518. These modules may include or be provided using one or more computers and/or servers, which may be general purpose computers, specialized server computers, server farms, server clusters, or any other appropriate arrangement and/or combination.

In operation 1534, a user using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the user may access a cloud User Interface (UI), cloud UI 1512, cloud UI 1514 and/or cloud UI 1516 and place a subscription order via these UIs. The order information received by cloud infrastructure system 1502 in response to the user placing an order may include information identifying the user and one or more services offered by the cloud infrastructure system 1502 that the user intends to subscribe to.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about users who wish to utilize the services provided by cloud infrastructure system 1502. Such information can include information that authenticates the identities of such users and information that describes which actions those users are authorized to perform relative to various system resources (e.g., files, directories, applications, communication ports, memory segments, etc.) Identity management module 1528 may also include the management of descriptive information about each user and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method, comprising:

identifying a multipart upload of a content object from a user system to a cloud storage system, wherein the multipart upload of the content object is divided into multiple parts where a part has a part number but does not have a byte range provided for the part, and the part number identifies the part and its position in the content object;

receiving a request to access at least a portion of the content object;

determining whether the multipart upload has completed;

upon determining that the multipart upload has completed, providing a response to the request from a fully completed upload copy of the content object at the cloud storage system; and upon determining that the multipart upload has not yet completed, checking against a shadow structure to determine whether a response can be provided from a partial upload copy of the content object at the cloud storage system;

wherein a byte range is estimated for the part number within the content object since the byte range is not provided for the part number associated with the part, and the byte range is estimated using at least one of the following techniques: (a) estimating the byte range based upon a first part byte range; or (b) estimating the byte range based upon multiple byte ranges for multiple prior parts that have been uploaded.

2. The method of claim 1, wherein the shadow structure tracks a list of part numbers that has already been uploaded.

3. The method of claim 1, wherein the shadow structure tracks the byte range for the part number.

4. The method of claim 1, wherein the byte range further generated using a user hint.

5. The method of claim 1, wherein the request specifies the part number, the part number is checked against the shadow structure to determine whether the part corresponding to the part number has been uploaded already, and if already uploaded then the part is provided in response to the request.

6. The method of claim 1, wherein the request specifies a byte offset or the byte range, the byte offset or the byte range is checked against the shadow structure to determine whether the part corresponding to the byte offset or the byte range has been uploaded already, and if already uploaded then the byte offset or the byte range is provided in response to the request.

7. A computer program product embodied on a computer readable medium, the computer readable medium having stored thereon a sequence of instructions which, when executed by a processor, executes a method comprising:

identifying a multipart upload of a content object from a user system to a cloud storage system, wherein the multipart upload of the content object is divided into multiple parts where a part has a part number but does not have a byte range provided for the part, and the part number identifies the part and its position in the content object;

receiving a request to access at least a portion of the content object;

determining whether the multipart upload has completed;

upon determining that the multipart upload has completed, providing a response to the request from a fully completed upload copy of the content object at the cloud storage system; and upon determining that the multipart upload has not yet completed, checking against a shadow structure to determine whether a response can be provided from a partial upload copy of the content object at the cloud storage system;

wherein a byte range is estimated for the part number within the content object since the byte range is not provided for the part number associated with the part, and the byte range is estimated using at least one of the following techniques: (a) estimating the byte range based upon a first part byte range; or (b) estimating the byte range based upon multiple byte ranges for multiple prior parts that have been uploaded.

8. The computer program product of claim 7, wherein the shadow structure tracks a list of part numbers that has already been uploaded.

9. The computer program product of claim 7, wherein the shadow structure tracks the byte range for the part number.

10. The computer program product of claim 7, wherein the byte range further generated using a user hint.

11. The computer program product of claim 7, wherein the request specifies the part number, the part number is checked against the shadow structure to determine whether the part corresponding to the part number has been uploaded already, and if already uploaded then the part is provided in response to the request.

12. The computer program product of claim 7, wherein the request specifies a byte offset or the byte range, the byte offset or the byte range is checked against the shadow structure to determine whether the part corresponding to the byte offset or the byte range has been uploaded already, and if already uploaded then the byte offset or the byte range is provided in response to the request.

13. A system, comprising:

a processor;

a memory for holding programmable code; and wherein the programmable code includes instructions executable by the processor for: identifying a multipart upload of a content object from a user system to a cloud storage system, wherein the multipart upload of the content object is divided into multiple parts where a part has a part number but does not have a byte range provided for the part, and the part number identifies the part and its position in the content object; receiving a request to access at least a portion of the content object; determining whether the multipart upload has completed; upon determining that the multipart upload has completed, providing a response to the request from a fully completed upload copy of the content object at the cloud storage system; and upon determining that the multipart upload has not yet completed, checking against a shadow structure to determine whether a response can be provided from a partial upload copy of the content object at the cloud storage system; wherein a byte range is estimated for the part number within the content object since the byte range is not provided for the part number associated with the part, and the byte range is estimated using at least one of the following techniques: (a) estimating the byte range based upon a first part byte range; or (b) estimating the byte range based upon multiple byte ranges for multiple prior parts that have been uploaded.

14. The system of claim 13, wherein the shadow structure tracks a list of part numbers that has already been uploaded.

15. The system of claim 13, wherein the shadow structure tracks the byte range for the part number.

16. The system of claim 15, wherein the byte range further generated using a user hint.

17. The system of claim 13, wherein the request specifies the part number, the part number is checked against the shadow structure to determine whether the part corresponding to the part number has been uploaded already, and if already uploaded then the part is provided in response to the request.

18. The system of claim 13, wherein the request specifies a byte offset or the byte range, the byte offset or the byte range is checked against the shadow structure to determine whether the part corresponding to the byte offset or the byte range has been uploaded already, and if already uploaded then the byte offset or the byte range is provided in response to the request.

* * * * *